(12) United States Patent
Kim et al.

(10) Patent No.: US 11,077,830 B2
(45) Date of Patent: Aug. 3, 2021

(54) LIDAR SENSOR AND CONTROL METHOD THEREOF

(71) Applicant: HYUNDAI MOBIS Co., Ltd., Seoul (KR)

(72) Inventors: Young Shin Kim, Yongin-si (KR); Won Gyum Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 253 days.

(21) Appl. No.: 16/359,915

(22) Filed: Mar. 20, 2019

(65) Prior Publication Data

US 2019/0351874 A1 Nov. 21, 2019

(30) Foreign Application Priority Data

May 15, 2018 (KR) .................. 10-2018-0055643

(51) Int. Cl.
| | |
|---|---|
| *G01S 17/931* | (2020.01) |
| *B60S 1/08* | (2006.01) |
| *G01S 7/486* | (2020.01) |
| *G01S 7/484* | (2006.01) |
| *G01S 7/497* | (2006.01) |

(52) U.S. Cl.
CPC ............. *B60S 1/0822* (2013.01); *G01S 7/484* (2013.01); *G01S 7/486* (2013.01); *G01S 7/497* (2013.01); *G01S 17/931* (2020.01)

(58) Field of Classification Search
CPC ........ B60S 1/0822; B60S 1/566; G01S 17/42; G01S 17/931; G01S 2007/4977; G01S 7/4813; G01S 7/484; G01S 7/486; G01S 7/497

See application file for complete search history.

(56) References Cited

U.S. PATENT DOCUMENTS

| 10,173,646 B1 * | 1/2019 | Rice ..................... B60S 1/485 |
| 2015/0090291 A1 * | 4/2015 | Na ........................ B60S 1/56 134/6 |
| 2020/0142041 A1 * | 5/2020 | Gassend ................ G01S 7/497 |

FOREIGN PATENT DOCUMENTS

KR  10-2015-0035204  4/2015

* cited by examiner

*Primary Examiner* — Mohammed S Rahaman

(74) *Attorney, Agent, or Firm* — H.C. Park & Associates, PLC

(57) ABSTRACT

A lidar sensor may include: a transmitter configured to transmit laser; a receiver configured to receive reflected laser; a mirror rotating unit configured to rotate a mirror in a designated direction, the mirror serving to reflect the transmitted or received laser; a cleaning device driving unit configured to drive a cleaning device to remove foreign matters adhering to the cover of the lidar sensor; a signal processing unit configured to determine when or where the lidar sensor is covered and calculate a distance to an object; and a control unit configured to control the transmitter not to transmit a laser signal or control a rotational velocity or rotation time of the mirror at a point of time that the lidar sensor is covered by the cleaning device, and control detection or utilization of the received signal when the distance to the object is calculated.

7 Claims, 5 Drawing Sheets

<Horizontal Sensing Lidar>

FIG.5

| Solution to signal loss | Effects | Application situation |
|---|---|---|
| Distance calculation unit: not utilize information detected at timing that sensor is covered, during distance calculation | Reduce error in distance calculation by not utilizing information detected at point of time or region that sensor is covered | When rotation speed of mirror is constant |
| Control unit: controls transmitter/receiver not to transmit/receive signal | Reduce waste of resources by not transmitting/receiving laser to/from covered region | |
| Control unit temporarily stops rotation of mirror and then rotates mirror, based on timing information | Reduce error in distance calculation and waste of resources, by not detecting information at point of time or region that sensor is covered | When no problems occur even though rotation velocity is slightly changed at each time |
| Control unit rotates mirror before point of time or period that sensor is covered by cleaning device | While rotation time is constantly maintained at each time, data for all regions can be extracted to increase reliability of data | When data are required for all rotation periods and rotation time is constantly maintained |

LIDAR SENSOR AND CONTROL METHOD THEREOF

CROSS-REFERENCES TO RELATED APPLICATION

This application claims priority from and the benefit of Korean Patent Application No. 10-2018-0055643, filed on May 15, 2018, which is hereby incorporated by reference for all purposes as if set forth herein.

BACKGROUND

Field

Exemplary embodiments relate to a lidar (light detection and ranging) sensor and a control method thereof, and more particularly, to a lidar sensor and a control method thereof, which can prevent a reduction of sensing performance by an operation of a wiper for removing contaminants, when the lidar sensor which needs to be exposed to the outside is contaminated by foreign matters.

Discussion of the Background

In general, a lidar sensor refers to a sensor that measures a distance using light, and senses an object. The lidar sensor has a similar principle to a radar.

The radar emits an electromagnetic wave to the outside and receives the electromagnetic wave to check a distance and direction, but the lidar sensor emits pulse laser. That is, since the lidar sensor uses short-wavelength laser, the lidar sensor can have high precision and resolution, and recognize an object in a three-dimensional manner.

For example, the lidar sensor may be mounted on a vehicle bumper, and sense an object or structure by monitoring an area at the front/rear of the vehicle. For reference, FIG. 1 illustrates the FOV (Field of View) of a lidar sensor mounted on the front/rear bumper of a vehicle.

The lidar sensor is usually mounted on the front bumper, and needs to be exposed to the outside. When the lidar sensor is installed in another structure such as a vehicle body or glass, the sensing performance of the sensor may be significantly degraded. Therefore, the lidar sensor is mounted so as to be exposed to the outside.

For reference, as illustrated in FIG. 2, the lidar sensor includes a transmitter to transmit laser, a receiver to receive reflected laser, and a driver to drive a mirror rotating motor. In addition, the lidar sensor includes a cover for protecting the sensor from foreign matters. The cover has a hot wire mounted thereon, and the hot wire serves to remove moisture or snow adhering to the surface of the cover.

However, since the lidar sensor serves to sense a distance to an object through a process of transmitting/receiving laser, the lidar sensor is very sensitive to contamination of the cover. Therefore, it is necessary to develop an apparatus for removing contaminants. Conventionally, a wiper is generally operated to remove contaminants. However, when the wiper is used to remove contaminants, a sensing signal may be lost while the sensor is covered by the wiper.

Therefore, there is a demand for a technique capable of solving the problem that a sensing signal of the lidar sensor may be lost when the wiper is operated.

The related art of the present invention is disclosed in Korean Patent Publication No. 10-2015-0035204 published on Apr. 6, 2015 and entitled "Apparatus and method for removing contamination of distance measuring sensor for vehicle".

The above information disclosed in this Background section is only for enhancement of understanding of the background of the invention and, therefore, it may contain information that does not constitute prior art.

SUMMARY

Exemplary embodiments of the present invention are directed to a lidar sensor and a control method thereof, which can prevent a reduction of sensing performance by an operation of a wiper for removing contaminants, when the lidar sensor which needs to be exposed to the outside is contaminated by foreign matters.

In one embodiment, a lidar sensor may include: a transmitter configured to transmit laser according to control of a control unit; a receiver configured to receive reflected laser according to control of the control unit; a mirror rotating unit configured to rotate a mirror in a designated direction according to control of the control unit, the mirror serving to reflect the transmitted or received laser; a cleaning device driving unit configured to drive a cleaning device to remove foreign matters adhering to the cover of the lidar sensor, according to control of the control unit; a signal processing unit configured to determine when or where the lidar sensor is covered and calculate a distance to an object, through operation timing information of the cleaning device or analysis of a received signal outputted from the receiver; and the control unit configured to control the transmitter not to transmit a laser signal or control a rotational velocity or rotation time of the mirror at a point of time that the lidar sensor is covered by the cleaning device, based on the operation timing information of the cleaning device, and control detection or utilization of the received signal when the distance to the object is calculated.

The cleaning device driving unit may output the operation timing information of the cleaning device to the signal processing unit, the cleaning device being driven according to control of the control unit.

The cleaning device may include a wiper.

When the mirror needs to be rotated at a constant rotational velocity, the control unit may control the distance calculation unit not to utilize a received signal for the distance calculation, the received signal being detected at a point of time corresponding to the operation timing information.

When the mirror needs to be rotated at a constant rotational velocity, the control unit may control the transmitter/receiver not to transmit/receive laser at a point of time that the lidar sensor is covered by the cleaning device, based on the operation timing information.

When the rotational velocity of the mirror can be adjusted, the control unit may temporarily stop the rotation of the mirror at the point of time that the lidar sensor is covered by the cleaning device, and then rotate the mirror, based on the operation timing information.

When a received signal is required for all rotation periods of the mirror and the rotation time of the mirror needs to be constantly maintained at each time, the control unit may receive a signal from the receiver by rotating the mirror before the point of time or period that the lidar sensor is covered.

In another embodiment, a control method of a lidar sensor may include: receiving, by a control unit of the lidar sensor, operation timing information of a cleaning device; checking, by the control unit, when or where the lidar sensor is covered by the cleaning device, based on the operation timing information; fetching, by the control unit, one or more of a plurality of lidar sensor operating methods which are stored in advance, when the check result indicates that a current point of time or region corresponds to a point of time or region that the lidar sensor is covered by the cleaning device; and not utilizing, by the control unit, a received signal for distance calculation, the received signal being detected at the point of time that the lidar sensor is covered, or calculating a distance using a received signal detected at a different point of time from the point of time that the lidar sensor is covered, according to the fetched lidar sensor operating method.

When the mirror needs to be rotated at a constant rotational velocity, the control unit may control a distance calculation unit not to utilize a received signal for the distance calculation, the received signal being detected at a point of time corresponding to the operation timing information, according to the fetched lidar sensor operating method.

When the mirror needs to be rotated at a constant rotational velocity, the control unit may control a transmitter/receiver not to transmit/receive laser at the point of time that the lidar sensor is covered by the cleaning device, based on the operation timing information, according to the fetched lidar sensor operating method.

When the rotational velocity of the mirror can be adjusted, the control unit may temporarily stop the rotation of the mirror at the point of time that the lidar sensor is covered by the cleaning device, and then rotate the mirror, based on the operation timing information, according to the fetched lidar sensor operating method.

When a received signal is required for all rotation periods of the mirror and the rotation time of the mirror needs to be constantly maintained at each time, the control unit may receive a signal from a receiver by rotating the mirror before the point of time or period that the lidar sensor is covered, according to the fetched lidar sensor operating method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 shows a table including lidar sensor operating methods in the case where the lidar sensor is covered by a cleaning device in FIG. 4.

DETAILED DESCRIPTION

Figure 1:
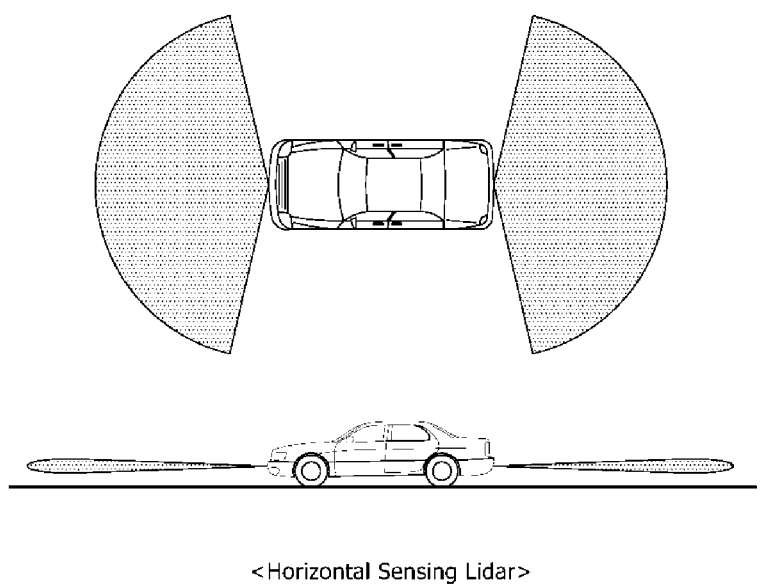
FIG. 1 illustrates the FOV (Field of View) of a lidar sensor mounted on a front/rear bumper of a vehicle.
Figure 2:
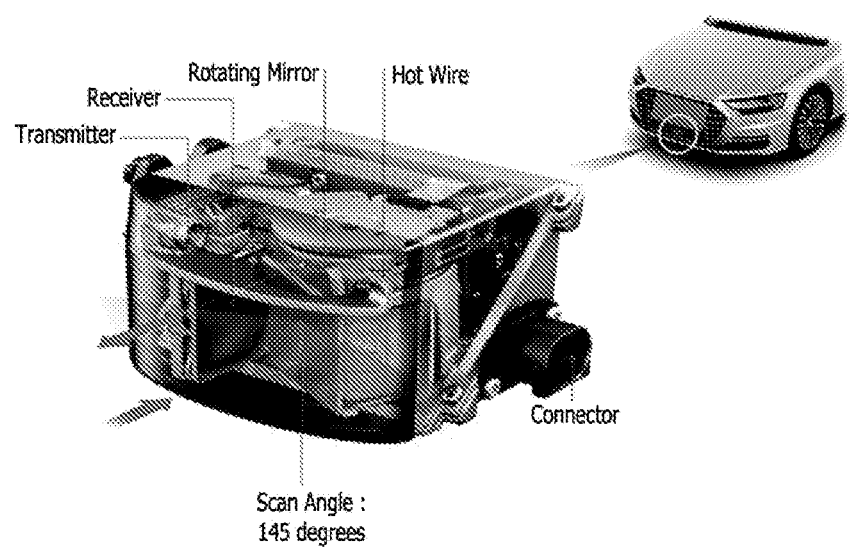
FIG. 2 illustrates a schematic configuration of an existing lidar sensor.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a lidar sensor and a control method thereof in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 3:
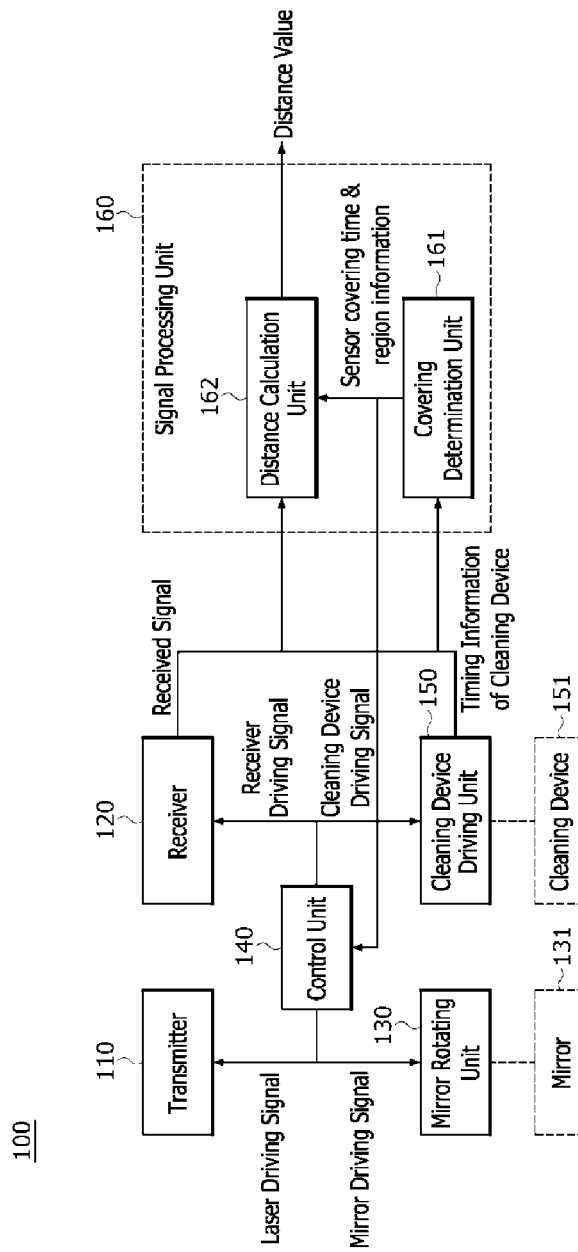
FIG. 3 illustrates a schematic configuration of a lidar sensor in accordance with an embodiment of the present invention.

FIG. 3 illustrates a schematic configuration of a lidar sensor in accordance with an embodiment of the present invention.

As illustrated in FIG. 3, the lidar sensor 100 in accordance with the present embodiment may include a transmitter 110, a receiver 120, a mirror rotating unit 130, a mirror 131, a control unit 140, a cleaning device driving unit 150, a cleaning device 151 and a signal processing unit 160.

The signal processing unit 160 may include a covering determination unit 161 and a distance calculation unit 162.

In the present embodiment, FIG. 3 illustrates the signal processing unit 160 as a separate component, in order to promote understandings of the operation. In another embodiment, however, the signal processing unit 160 may be included in the control unit 140.

The transmitter 110 may transmit laser (light) according to a laser driving signal outputted from the control unit 140.

The receiver 120 may receive reflected laser (light) according to a receiver driving signal outputted from the control unit 140.

The mirror rotating unit 130 may rotate the mirror 131 in a designated direction according to a mirror driving signal outputted from the control unit 140, and reflect the transmitted/received laser (light).

The cleaning device driving unit 150 may drive the cleaning device 151 according to a cleaning device driving signal outputted from the control unit 140. Thus, the cleaning device 151 may remove foreign matters adhering to the cover of the lidar sensor.

The cleaning device driving unit 150 may output timing information of the actually driven cleaning device 151 to the signal processing unit 160 according to control of the control unit 140.

The signal processing unit 160 may determine whether the lidar sensor 100 is covered, through the operation timing of the cleaning device 151 (for example, a wiper) or analysis of the received signal.

More specifically, the covering determination unit 161 of the signal processing unit 160 may determine whether the lidar sensor 100 is covered by an operation of cleaning the cover of the lidar sensor 100. For example, the covering determination unit 161 may determine a point of time that the lidar sensor 100 is covered, based on the timing information outputted from the cleaning device 151, or the characteristic of the signal received through the receiver 120 (for example, the time or pattern that the signal is measured).

The distance calculation unit 162 of the signal processing unit 160 may serve to calculate a distance to an object, based on the characteristic information of the received signal (for example, the time or pattern that the signal is measured). When calculating the distance, the distance calculation unit 162 may not utilize information detected at the point of time that the lidar sensor was covered, based on the covering information of the lidar sensor 100.

When driving the transmitter 110, the control unit 140 may control the transmitter 110 not to emit (transmit) a laser signal, temporarily stop the rotation of the mirror 131, or more rapidly rotate the mirror 131, based on the timing information of the cleaning device 151, transmitted from the covering determination unit 161, i.e. the covering information of the lidar sensor, at the point of time that the lidar sensor 100 is covered by the cleaning device 151.

In the embodiment, the point of time may indicate the point of time that the lidar sensor 100 is covered by the cleaning device 151. In reality, however, the control unit 140 outputs a driving signal (or control signal) to the cleaning device driving unit 150 before the cleaning device 151 is operated. Therefore, the point of time may be understood as a point of time that the lidar sensor 100 will be covered by the cleaning device 151.

The operation of the lidar sensor 100 when the lidar sensor 100 is covered by the cleaning device 151 (for example, a wiper) will be described in more detail with reference to FIGS. 4 and 5.

Figure 4:
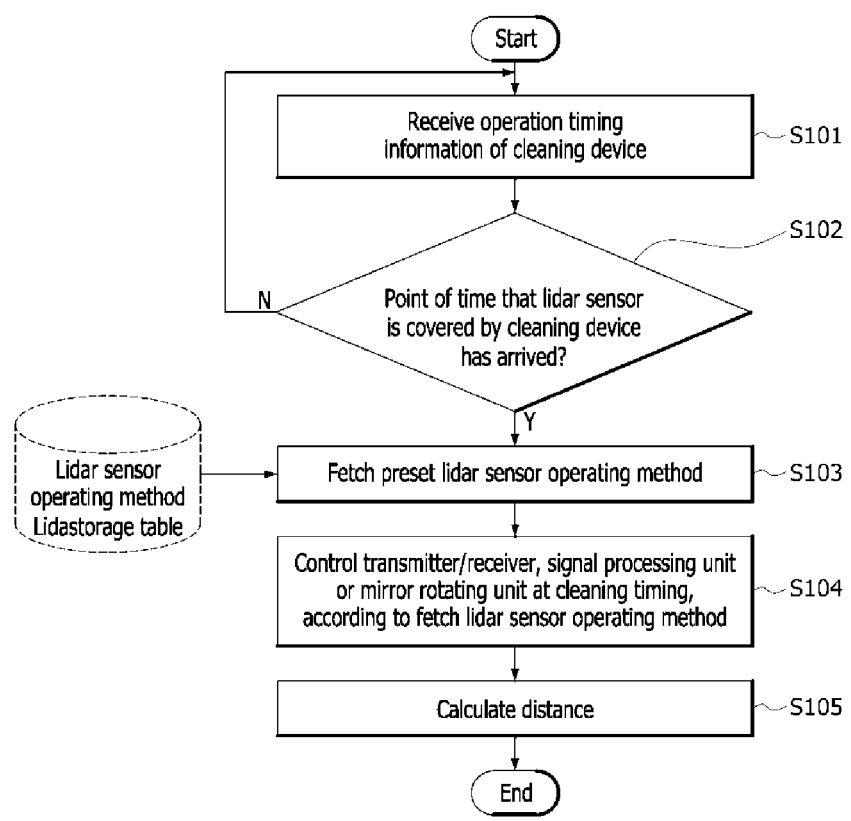
FIG. 4 is a flowchart illustrating a control method of a lidar sensor in accordance with an embodiment of the present invention.

FIG. 4 is a flowchart illustrating a control method of a lidar sensor in accordance with an embodiment of the present invention.

As illustrated in FIG. 4, the control unit 140 (or the signal processing unit) may receive operation timing information of the cleaning device 151 at step S101.

The control unit 140 may check a point of time that the lidar sensor 100 is covered or will be covered by the cleaning device 151 or check whether the lidar sensor 100 is in a region corresponding to the point of time, based on the operation timing information, at step S102.

When the check result indicates that the point of time that the lidar sensor 100 is covered or will be covered by the cleaning device 151 has arrived (Y at step S102), the control unit 140 may fetch one or more lidar sensor operating methods from a table (or internal memory) in which preset lidar sensor operating methods (first to fourth methods) are stored, at step S103.

FIG. 5 shows the table including the lidar sensor operating methods in the case where the lidar sensor is covered by the cleaning device in FIG. 4.

The control unit 140 may control the transmitter/receiver 100/120, the signal processing unit 160 or the mirror rotating unit 130 at cleaning timing, according to the lidar sensor operating method fetched from the table.

For example, when the mirror 131 needs to be rotated at a constant rotational velocity, the control unit 140 may apply a first method of FIG. 5. Specifically, the control unit 140 may control the distance calculation unit 162 not to utilize sensing information (received signal) detected at a point of time corresponding to the timing information indicating the timing at which the lidar sensor is covered, when the distance calculation unit 162 calculates a distance. Thus, the distance calculation unit 162 may not utilize the information detected at the point of time that the lidar sensor 100 is covered (or information of a covered region of the lidar sensor), thereby reducing an error which may occur during the distance calculation.

Furthermore, when the rotational velocity of the mirror 131 needs to be constant, the control unit 140 may apply a second method. Specifically, the control unit 140 may control the lidar sensor 100 not to transmit/receive laser at the point of time that the lidar sensor 100 is covered or to/from the covered region of the lidar sensor. Thus, the transmitter/receiver may not transmit/receive laser at the point of time that the lidar sensor 100 is covered or to/from the covered area of the lidar sensor, thereby reducing waste of resources.

Furthermore, when no problems occur even though the rotational velocity of the mirror 131 is slightly changed at each time (or during each scan), the control unit 140 may apply a third method. Specifically, the control unit 140 may temporarily stop rotation of the mirror 131 at a point of time corresponding to the timing information indicating the timing at which the lidar sensor is covered, and then rotate the mirror 131 again. Therefore, although the rotation time of the mirror 131 is changed at each time, an error in distance calculation can be reduced, and the waste of resources by the rotation of the mirror can be reduced.

Furthermore, when data (received signal) are required for all rotation periods and the rotation time of the mirror needs to be constantly maintained at each time, the control unit 140 may apply a fourth method. Specifically, the control unit 140 may rotate the mirror 131 before a period in which the covering of the lidar sensor 100 will occur, or change only the rotation cycle of the mirror while the rotation time of the mirror is constantly maintained at each time, and then receive a sensing signal, i.e. a received signal. Thus, data (received signal) for all regions (scan regions) can be extracted, which makes it possible to raise the reliability of the data.

The above-described four operating methods can be independently performed or combined.

For reference, the first and second methods may be applied when adaptive control of the mirror rotating unit 130 (for example, motor) is impossible, and neither utilize the information detected at the point of time that the lidar sensor 100 is covered, nor generate a signal. On the other hand, the third and fourth methods may be applied when intermittent control of the mirror rotating unit 130 (for example, motor) is possible. When the rotational velocity of the mirror can be changed at each time or the rotation cycle of the mirror can be changed, the third and fourth methods can be applied.

As described above, the control unit 140 may control one or more of the transmitter/receiver 110/120, the signal processing unit 160 and the mirror rotating unit 130 at the cleaning timing, according to a lidar sensor operating method fetched from the table. Thus, the control unit 140 may not utilize the information (received signal) for the distance calculation, the information being detected at the point of time that the lidar sensor is covered, or calculate a distance using information (received signal) detected at a point of time different from the point of time that the lidar sensor is covered, at step S105.

In accordance with the present embodiment, when the lidar sensor which needs to be exposed to the outside is contaminated by foreign matters, the control method can prevent a reduction in sensing performance of the lidar sensor by the operation of the cleaning device (for example, wiper) for removing contaminants.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A lidar sensor comprising:
   a transmitter configured to transmit laser;
   a receiver configured to receive reflected laser;
   a mirror rotating unit configured to rotate a mirror in a designated direction, the mirror serving to reflect the transmitted or received laser;
   a cover;
   a cleaning device driving unit configured to drive a cleaning device to remove foreign matters adhering to the cover of the lidar sensor;
   a hardware control unit configured to control the transmitter, the receiver, and the cleaning device driving unit; and
   a hardware signal processing unit configured to determine when or where the lidar sensor is covered and calculate a distance to an object, through operation timing information of the cleaning device or analysis of a received signal outputted from the receiver,
   wherein the hardware control unit is configured to control the transmitter not to transmit a laser signal or control a rotational velocity or rotation time of the mirror at a point of time that the lidar sensor is covered by the cleaning device, based on the operation timing information of the cleaning device, and control detection or utilization of the received signal when the distance to the object is calculated.

2. The lidar sensor of claim 1, wherein the cleaning device driving unit is configured to output the operation timing information of the cleaning device to the hardware signal processing unit, and the hardware control unit is configured to drive the cleaning device.

3. The lidar sensor of claim 1, wherein the cleaning device comprises a wiper.

4. The lidar sensor of claim 1, wherein when the mirror needs to be rotated at a constant rotational velocity, the hardware control unit is configured to not to utilize a received signal for a distance calculation, the received signal being detected at a point of time corresponding to the operation timing information.

5. The lidar sensor of claim 1, wherein when the mirror needs to be rotated at a constant rotational velocity, the hardware control unit is configured to control the transmitter or the receiver not to transmit or receive laser at a point of time that the lidar sensor is covered by the cleaning device, based on the operation timing information.

6. The lidar sensor of claim 1, wherein when the rotational velocity of the mirror can be adjusted, the hardware control unit is configured to temporarily stop a rotation of the mirror at the point of time that the lidar sensor is covered by the cleaning device, and then rotate the mirror, based on the operation timing information.

7. The lidar sensor of claim 1, wherein when a received signal is required for all rotation periods of the mirror and the rotation time of the mirror needs to be constantly maintained at each time, the hardware control unit is configured to receive a signal from the receiver by rotating the mirror before the point of time or period that the lidar sensor is covered.

* * * * *